May 1, 1928.
C. Y. HAKE
1,668,454
COMBINED COFFEE CHURN AND STRAINER
Filed Oct. 12, 1927
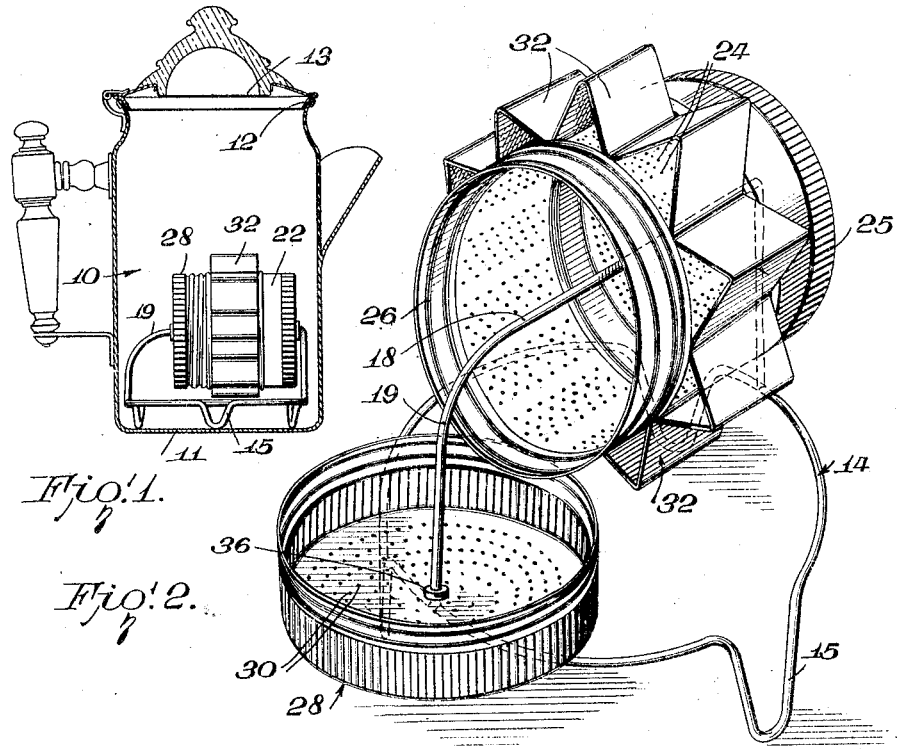
Fig. 1.
Fig. 2.
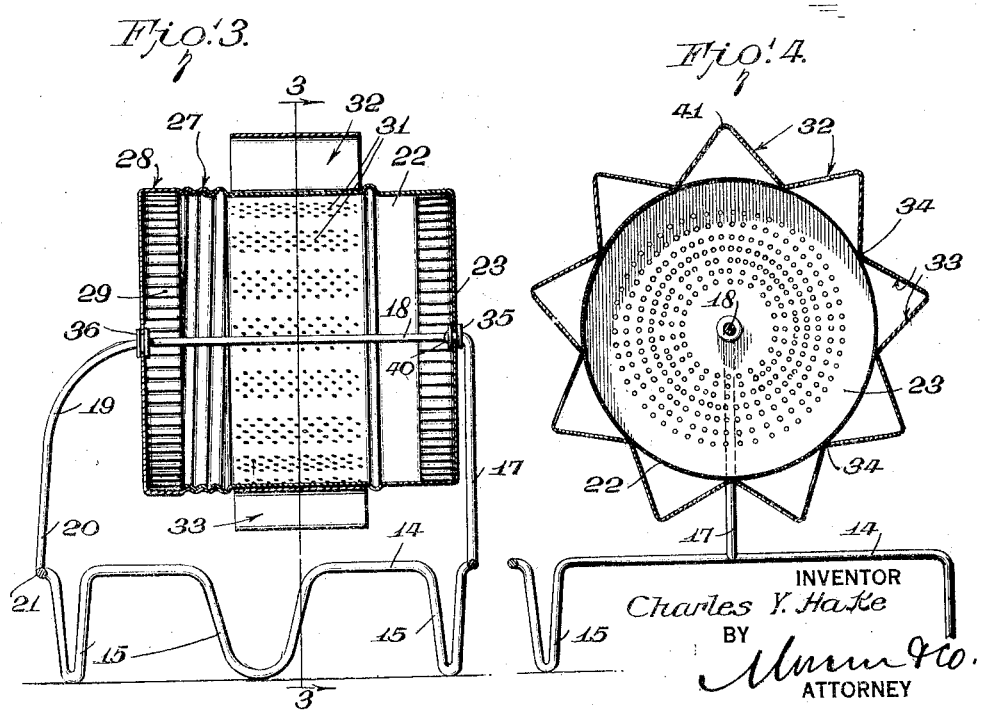
Fig. 3.
Fig. 4.
INVENTOR
Charles Y. Hake
BY
ATTORNEY Patented May 1, 1928.

1,668,454

UNITED STATES PATENT OFFICE.

CHARLES Y. HAKE, OF YORK, PENNSYLVANIA.

COMBINED COFFEE CHURN AND STRAINER.

Application filed October 12, 1927. Serial No. 225,820.

This invention relates to a combined coffee churn and strainer.

In the usual method of preparing coffee from ground roasted coffee beans, the grounds are placed within a perforated container adjacent the top of the coffee pot and within the same and water is forced upwardly and down upon the grounds permitting the water to percolate or sift through the grounds. The water must be maintained at a predetermined boiling point in order to prevent the water from forcing the grounds from the perforated container, otherwise the excessive ebullition will cause the coffee and discharged grounds to boil over and clog the fine perforations of the usual gas burner.

It is an object of the present invention to provide a device for the preparation of coffee which will maintain the grounds housed within a perforated container at all times, while causing the grounds to be agitated through the boiling water and permitting the water to pass through the solution in the coffee pot, while at the same time the grounds are maintained out of contact with the bottom of the pot thus eliminating all danger of burning the grounds when no water remains in the pot.

Another object of the invention is the provision of a combined churn and strainer adapted to be placed within a coffee pot for housing a predetermined quantity of coffee grounds and in which the boiling of the water will cause rotation of the strainer and provide a circulation of the water in the pot through the strainer and through the grounds.

A further object of the invention is the provision of a perforated container provided with propeller blades or vanes which are adapted to be actuated by the boiling water in a coffee pot for causing rotation of the perforated container which will permit the circulation of water therethrough and through the grounds housed therein, the grounds being churned during the operation in the water while said grounds are being maintained within the container.

This invention will be best understood from a consideration of the following detailed description in connection with the accompanying drawings, nevertheless, it is to be understood that the invention is not confined to the disclosure being susceptible of such changes and modifications as shall define no departure from the salient features of the invention as expressed in the appended claims.

In the drawings:—

Figure 1 is a view in elevation of the coffee pot with parts broken away showing my invention applied thereto, Figure 2 is a view in perspective of the combined churn and coffee strainer with the closure removed, Figure 3 is a longitudinal vertical section of the churn and strainer, Figure 4 is a transverse section taken along the line 4—4 of Fig. 3.

Referring more particularly to the drawings 10 designates a coffee pot having a bottom portion 11 and an opening 12 at the top which is normally closed by a hinged cover 13.

The device which is adapted to be located within the coffee pot and which forms a substitute for the usual percolating device, includes a base member or standard generally designated by the numeral 14 and may be preferably formed of a single piece of wire. This wire is bent downwardly in a U-shaped member as shown at 15 to form feet for maintaining the standards 14 in spaced relation within the bottom 11 of the coffee pot 10.

Secured to the member 14 is a vertically disposed standard 17 having a horizontal axle 18 integrally formed therewith which is curved downwardly, as shown at 19, to provide a second standard 20 secured at 21 to the base member 14. The standards 17 and 20 and the axle 18 are located in a vertical plane which passes substantially through the diameter of the circular base member 14. A perforated container 22 is preferably cylindrical in shape and has an end wall 23 formed integrally therewith and perforated, as shown at 24. A portion of the wall of the cylinder, as shown at 25, is provided with a plurality of ribs forming a roughened surface whereby the cylindrical container may be tightly grasped at the closed end by the hand. The opposite end of the container, as shown at 26, is open and threaded in order to receive the threads 27 of a closure 28. This closure is likewise provided with a plurality of ribs 29 forming a roughened surface on the exterior of the closure so that the same may be tightly grasped by the fingers and revolved for unscrewing and screwing the cap or closure onto the open end of the cylinder 22. The end wall of the closure, as shown at 20, is perforated as is the side walls of the container, as shown at 31, to provide for the circulation of water through the container during the preparation of the coffee.

A plurality of blades or vanes 32 are formed from a single strip of metal, and these blades are V-shaped in cross section, as shown in Fig. 4, and have inclined side walls 33. A portion of the metal strip which connects the blades together in an integral formation is secured in any approved manner, as shown at 34, to the periphery of the container 22. The opposite ends of the V-shaped blades, as shown in Fig. 2, are open.

A bearing 35 is forced onto the end wall 23 where the axle 18 passes through the end wall and is secured to said end wall so that as the cylinder is revolved, the bearing will support the cylinder at this point and maintain the end 23 in spaced relation with the standard 17. The cap or closure 28, as shown at 36, is also provided with a bearing which has its opposite edges flanged and forced into relation with the opposite faces of the end walls of the closure 28, and this bearing is received by the axle 18 so that the cylinder or container 22 is supported at its opposite ends by the bearings 35 and 36.

The operation of my device is as follows:

Before the combined churn and strainer is placed in the coffee pot, the cap or closure 28 is unscrewed and the proper quantity of ground coffee is placed within the container 22 and it is immaterial whether the cylinder is partially filled or totally filled, the results will be the same. After the proper quantity of grounds have been placed in the container, the cap 28 is screwed back onto the same and the churn is placed within the coffee pot and supported by the feet 15 in spaced relation from the bottom of the pot. It will be noted, however, that when the cap 28 is removed the curved portion 19 which connects the standard 20 and the axle 18 facilitates the removal of the cap since the same may be moved downwardly and outwardly away from the end of the container while the bearing 36 rides on the curved portion 19 and the standard 20 until it rests upon the base member 14.

After the churn has been placed within the coffee pot the proper quantity of water is poured into the pot to such a height that the water will cover the uppermost blades 32. The pot is then placed upon the heater and when the water begins to boil the circulation of the water will cause water to dash upwardly against and over the propellers and cause the rotation of the cylinder 22. The rotation of the cylinder or container will continue until the boiling has ceased. During boiling the water will be circulated through the container in the coffee pot and the constant churning of the grounds in the water within the container will provide for most effective preparation of the coffee, while at the same time preventing the grounds from passing into the liquid outside of the container 22.

It will be noted that the base member which is of the open frame work type to permit circulation of the water, is of sufficient size to extend beyond the periphery at any point of the cylinder 22 and the vanes 32, so that the vanes or cylinder will not at any time come in contact with the walls of the coffee pot and prevent rotation of the same.

While I have particularly described the device as capable of being used for the preparation of coffee it will be appreciated that such device may be used for other purposes such as in the preparation of tea or for use with solids which would ordinarily stick to the bottom of a pot and cause burning. In the last mentioned use the liquid in the pot will gradually dissolve the solids in the container, while maintaining said solids out of contact with the bottom of the pot.

It will not be necessary to exercise any care in placing the combined churn and strainer within the coffee pot since the boiling water which is in circulation will act on the vanes and cause rotation of the cylinder. In other words, it is not necessary to place the container in the exact center of the pot in order to obtain results.

The curved portions 19 of the axle 18 permits the cover or lid 28 to clear readily the open end of the container in all directions so that there will be no interference from the lid during the filling or discharging of the contents of the container. The container is maintained against sliding movement by a collar 40 which is secured to the axle 18 adjacent the bearing 35.

The propellers are so designed that they will revolve in either direction by the circulation of the boiling water in the coffee pot and are rounded at their outer ends, as shown at 41, in order to avoid injury to the hand of the operator. These propeller blades are open at their opposite ends to permit the circulation of water therethrough and it will be noted that the main body of the cylinder beneath these blades and within the passages through said blades are perforated to permit the circulation of water at such points. Circulation is also maintained, as will be seen, through the opposite ends of the cylinder because of the perforations in the end 23 of the cylinder 22 and the perforations 30 in the cap or closure 28.

In the preparation of tea, the leaves are placed within the container after which the cap 28 is applied and the device is placed within any kind of a vessel and the leaves allowed to steep. Some kitchen utensil, such as a spoon or fork may be employed for causing rotation of the cylinder by the application of such implement to the propeller blades. It will be appreciated that in the preparation of tea the water is not permitted to boil while the container has been supplied with tea leaves.

During the heating of the water which causes ebullition of the same, the water is caused to circulate in the pot which causes rotation of the cylinder by the action of the circulating water on the blades and the coffee is simply steamed within the container and the boiling water is directed from beneath the container, from the sides of the pot and upwardly over the churn while the hot water circulates through the strainer without causing any of the grounds within the container to be discharged into the pot.

By this construction the coffee grounds will be maintained at all times above the bottom of the pot which may be of any type and need not be particularly designed for the purpose as in the case of the well known percolator.

I claim:—

1. A device of the character described comprising a cylinder having the walls thereof perforated, a series of propellers in spaced relation on the cylinder, an axle adapted to support the cylinder for rotation, and means for supporting the axle and cylinder in spaced relation with the bottom of a pot.

2. A device of the character described comprising a cylinder having the walls thereof perforated, a series of vanes surrounding the cylinder, an axle adapted to support the cylinder for rotation, and means for supporting the axle and cylinder in spaced relation with the bottom of a coffee pot, said vanes being V-shaped and spaced from the outer wall of the cylinder to provide for the circulation of water between the vanes and the wall of the cylinder.

3. A device of the character described comprising a cylinder having the walls thereof perforated, a series of vanes surrounding the cylinder, an axle adapted to support the cylinder for rotation, means for supporting the axle and cylinder in spaced relation with the bottom of a coffee pot, said cylinder having an open end, and a perforated closure removably connected to the open end of said cylinder.

4. A device of the character described comprising a cylinder having the walls thereof perforated, a series of vanes surrounding the cylinder, an axle adapted to support the cylinder for rotation, a base member, a standard connecting one end of the axle, a second standard supporting the other end of the axle and having a curved portion where connected to said axle, said cylinder having an open end, a closure removably connected with the open end and provided with an axial passage, said closure being slidable on the curved portion and on the second standard when removed from the cylinder.

5. In a coffee pot, a combined churn and strainer comprising a perforated cylinder having an open end, a closure removably connected to the open end of the cylinder, the closure and an end of the cylinder, each being provided with a bearing, an axle received by the bearings, the opposite ends of the axle being extended downwardly, one of the extensions being curved to permit sliding movement of the closure when removed, and a base member secured to the extension.

6. In a coffee pot, a combined churn and strainer comprising a perforated cylinder having an open end, a closure removably connected to the open end of the cylinder, the closure and an end of the cylinder, each being provided with a bearing, an axle received by the bearings, the opposite ends of the axle being extended downwardly, one of the extensions being curved to permit sliding movement of the closure when removed, and a base member secured to the extension, and means to cause rotation of the cylinder.

7. In a coffee pot, a combined churn and strainer comprising a perforated cylinder having an open end, a closure removably connected to the open end of the cylinder, the closure and an end of the cylinder, each being provided with a bearing, an axle received by the bearings, the opposite ends of the axle being extended downwardly, one of the extensions being curved to permit sliding movement of the closure when removed, a base member secured to the extension, and a series of vanes secured to the outer wall of the cylinder.

8. In a coffee pot, a combined churn and strainer comprising a perforated cylinder having an open end, a closure removably connected to the open end of the cylinder, the closure and an end of the cylinder, each being provided with a bearing, an axle received by the bearings, the opposite ends of the axle being extended downwardly, one of the extensions being curved to permit sliding movement of the closure when removed, a base member secured to the extension, and a series of vanes secured to the outer wall of the cylinder, said vanes being spaced from the cylinder to provide for the circulation of water between the vanes and cylinder.

9. In a coffee pot, a combined churn and strainer comprising a perforated cylinder having an open end, a closure removably connected to the open end of the cylinder, the closure and an end of the cylinder, each being provided with a bearing, an axle received by the bearings, the opposite ends of the axle being extended downwardly, one of the extensions being curved to permit sliding movement of the closure when removed, a base member secured to the extension, a fixed collar on the axle adjacent the bearing on the end of the cylinder for preventing the sliding movement of the cylinder on the axle.

10. A device of the character described comprising a perforated cylinder having an open end, a closure for said end, means for supporting the cylinder for rotation, and means adapted to be actuated by a moving fluid for causing rotation of the cylinder.

11. A device of the character described comprising a perforated cylinder having an open end, a closure for said end, means for supporting the cylinder for rotation, and means adapted to be actuated by a moving fluid for causing rotation of the cylinder, said cap being slidably mounted on the supporting means.

12. A device of the character described comprising a perforated cylinder having an open end, a closure for said end, means for supporting the cylinder for rotation, and means adapted to be actuated by a moving fluid for causing rotation of the cylinder, said cap being slidably mounted on the supporting means, means for preventing sliding movement of the cylinder on the supporting means.

13. A combined coffee churn and strainer comprising a perforated container, means for rotatably supporting the same, means adapted to be acted on by a moving fluid for causing rotation of the container.

14. A device of the character described comprising a cylinder having the walls thereof perforated, a plurality of blades or vanes formed of a single strip of metal and connected to the cylinder, said blades being V-shaped in cross section, said blades having inclined walls the inner ends of the walls where connected together being secured to the outer wall of the container, and means for rotatably supporting the cylinder.

Signed at Washington, in the District of Columbia, this 29th day of September, 1927.

CHARLES Y. HAKE.